United States Patent
Wynn, Jr.

(10) Patent No.: US 7,984,728 B2
(45) Date of Patent: *Jul. 26, 2011

(54) FUEL PRESSURE REGULATOR VALVE ASSEMBLY

(75) Inventor: James Archie Wynn, Jr., Virginia Beach, VA (US)

(73) Assignee: Continental Automotive Systems US, Inc., Auburn Hills ( * ) Notice: Subject to any disclaimer, the term of this patent is extended or adjusted under 35 U.S.C. 154(b) by 995 days.

This patent is subject to a terminal disclaimer.

(21) Appl. No.: 11/256,312

(22) Filed: Oct. 21, 2005

(65) Prior Publication Data

US 2006/0108006 A1 May 25, 2006
US 2009/0308468 A9 Dec. 17, 2009

Related U.S. Application Data

(63) Continuation-in-part of application No. 10/997,654, filed on Nov. 24, 2004, now abandoned.

(60) Provisional application No. 60/621,246, filed on Oct. 22, 2004.

(51) Int. Cl.
*F16K 15/04* (2006.01)
*F01L 3/10* (2006.01)
*F16F 1/34* (2006.01)

(52) U.S. Cl. ......... 137/539; 251/337; 251/368; 267/161

(58) Field of Classification Search .................. 137/535, 137/539, 539.5, 540; 123/506, 511, 514; 267/161; 251/337, 368
See application file for complete search history.

(56) References Cited

U.S. PATENT DOCUMENTS

| | | | | |
|---|---|---|---|---|
| 2,034,855 A | | 3/1936 | Alby | |
| 2,249,971 A | * | 7/1941 | Mecorney, David B | 137/537 |
| 2,947,529 A | * | 8/1960 | Schwartz et al. | 267/161 |
| 3,254,845 A | * | 6/1966 | Schlosser Paul W | 137/539 |
| 3,483,888 A | * | 12/1969 | Wurzel, Hugo | 137/539 |
| 3,598,389 A | * | 8/1971 | Kohler | 267/161 |
| 3,768,509 A | * | 10/1973 | Goda | 137/539 |
| 4,045,009 A | * | 8/1977 | Pees | 137/859 |
| 4,665,940 A | * | 5/1987 | Jacobson | 137/539 |
| 4,838,313 A | | 6/1989 | Kobayashi et al. | |
| 4,862,907 A | * | 9/1989 | Ledtje et al. | 137/533.11 |
| 5,107,890 A | * | 4/1992 | Gute | 137/539 |
| 6,145,536 A | * | 11/2000 | Gerhard et al. | 123/514 |
| 6,293,259 B1 | | 9/2001 | Kilgore et al. | |

(Continued)

FOREIGN PATENT DOCUMENTS

DE 4426667 2/1996
(Continued)

*Primary Examiner* — John Rivell (57) ABSTRACT

A flow through pressure regulator apparatus and method for directing a flow of fuel and reducing valve seat wear within a fuel system. Present invention includes a lower housing having fuel inlet where fuel flows through the fuel inlet and communicates with a valve assembly and valve biasing member. The valve assembly comprises a lower and upper valve member where the lower valve element contains a plurality of fuel passages. The valve biasing member permits or inhibits fuel flow through the lower valve member by opening and closing an upper valve member. The valve biasing member comprises a flat disk having at least two reticulated concentric rings coupled by at least one bridge. The fuel flows past an open upper valve member through the plurality of fuel passages that encircle the lower valve member to the valve biasing member. The valve biasing member then diffuses the flow of fuel. A fuel cover directs the flow of fuel from the valve biasing member to the fuel outlet.

22 Claims, 6 Drawing Sheets

U.S. PATENT DOCUMENTS

| | | | |
|---|---|---|---|
| 6,401,749 B1 * | 6/2002 | Tai et al. | 137/540 |
| 6,668,849 B2 * | 12/2003 | Onstenk et al. | 137/512.15 |
| 7,819,132 B2 * | 10/2010 | Etheridge et al. | 137/539 |
| 2004/0069361 A1 | 4/2004 | Cheng et al. | |
| 2004/0177884 A1 | 9/2004 | Konishi | |

FOREIGN PATENT DOCUMENTS

| | | |
|---|---|---|
| DE | 10022275 A1 | 12/2000 |
| DE | 10107223 | 8/2002 |
| EP | 0491522 A | 6/1992 |
| JP | 2001027163 | 1/2001 |

* cited by examiner

FUEL PRESSURE REGULATOR VALVE ASSEMBLY

CROSS-REFERENCE TO RELATED APPLICATIONS

This application is a continuation in part of U.S. patent application Ser. No. 10/997,654, filed 24 Nov. 2004, now abandoned the entirety of which is incorporated by reference. This application claims priority to U.S. Provisional Patent Application Ser. No. 60/621,246 filed 22 Oct. 2004.

FIELD OF INVENTION

This invention relates to pressure control devices in general and more particularly, a pressure control device containing a valve assembly that guides an upper valve member and includes a plurality of fuel passages for directing the flow of fuel used in automotive fuel systems.

BACKGROUND

Most modern automotive fuel systems use fuel injectors to deliver fuel to the engine cylinders for combustion. The fuel injectors are mounted on a fuel rail to which fuel is supplied by a pump. The pressure at which the fuel is supplied to the fuel rail must be metered to ensure the proper operation of the fuel injector. Metering is carried out using pressure regulators which control the pressure of the fuel in the system at all engine r.p.m. levels.

Pressure regulators known in the art use a valve biasing member biased to a valve seat with a longitudinal flow passage. At low fuel pressures, the valve seat is biased to a closed position to prevent the flow of fuel through the pressure regulator. As fuel pressure builds in the system, the pressure against the valve seat overcomes the biasing force of the valve biasing member, allowing fuel to flow through the valve seat, thereby controlling the fuel pressure in the system.

While such pressure regulators have been proven satisfactory, they require a substantial number of parts. In an ongoing effort to reduce the material and manufacturing costs of fuel pressure regulators, there exists a need to develop a fuel pressure regulator that is small in size with fewer parts. There also exits a need to develop a valve assembly that prevents wear of the valve seat due to erratic movement of the upper valve member.

Thus, it is believed that there is a need to provide a pressure regulator to overcome the disadvantages of the known pressure regulator.

SUMMARY OF INVENTION

In accordance with one aspect of this invention, a flow through pressure regulator comprising: a lower housing having a fuel inlet wherein a flow of fuel through the fuel inlet communicates with a valve assembly; the valve assembly comprising a lower valve member wherein a plurality of fuel passages are circumferentially spaced around a top portion of the lower valve member to direct the flow of fuel; the valve assembly regulating the flow of fuel from a fuel inlet through the lower housing to a fuel outlet wherein an upper valve member rests on a valve seat in a closed position to prohibit the flow of fuel from the fuel inlet to the fuel outlet; a valve biasing member for biasing the upper valve member toward the fuel chamber in opposition to pressure exerted on the upper valve member by the fuel in the fuel chamber; and a fuel cover for directing the flow of fuel from the valve biasing member to the fuel outlet.

In accordance with another aspect of this invention, a valve assembly for a pressure regulator comprising: an upper valve member; a lower valve member housing the upper valve member wherein a plurality of fuel passages are disposed around the circumference of the an upper portion of the lower valve member to direct the flow of fuel received from a fuel inlet; and the upper valve member resting on a valve seat in a closed position to prohibit the flow of fuel from the fuel inlet to a fuel outlet.

In accordance with another aspect of this invention, a method for regulating fuel in a flow through pressure regulator, the method comprising: providing a lower valve member comprising a plurality of fuel passages to direct fuel from a fuel inlet to a fuel outlet; communicating the fuel flow with a valve biasing member after the fuel flows through the lower valve member; and providing an upper valve member to prohibit the fuel flow to the fuel outlet.

It is therefore an object of the present invention to provide improved flow characteristics of a fuel pressure regulator free of any additional parts.

It is an object of the present invention to improve valve seat wear by guiding the upper valve member as it is lifted off the seat.

It is also an object of the present invention to reduce the materials and manufacturing costs of fuel pressure regulators.

DETAILED DESCRIPTION

Figure 1:
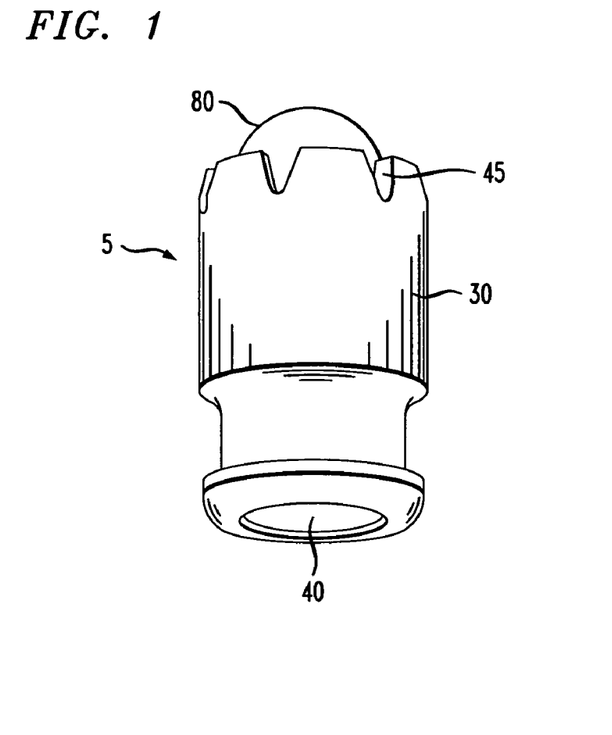
FIG. 1 illustrates a perspective view of the valve assembly with a plurality of fuel passages in the lower valve member.
Figure 2:
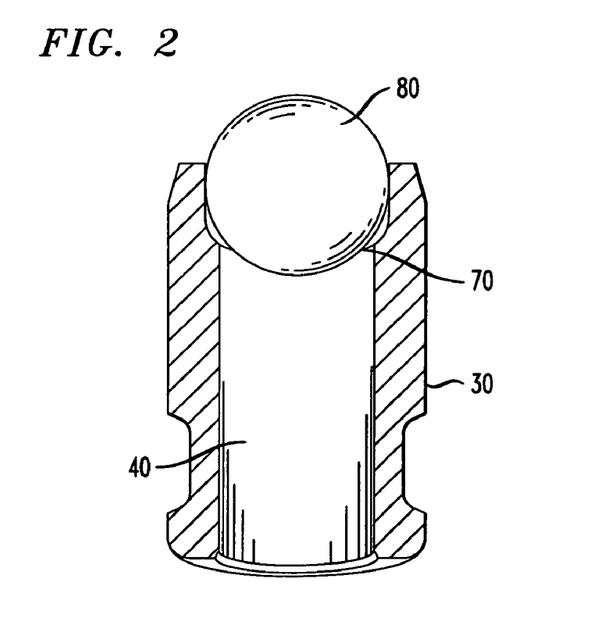
FIG. 2 shows cross section view of the valve assembly.

FIGS. 1 and 2 illustrate a valve assembly 5 according to the present invention comprising a lower valve member 30 and an upper valve member 80. The lower valve member 30 includes a fuel chamber 40 which is generally cylindrical in shape and contains a plurality of spaced fuel passages 45 surrounding the top portion of the lower valve member 30. The plurality of fuel passages 45 will control and direct fuel as it passes valve seat 70. By changing the depth, width and angle of a side wall of the plurality of fuel passages 45, pressure may be regulated and configured to allow a constant pressure flow. Others skilled in the art may be able to change the performance of the valve assembly 5 by controlling the above mentioned parameters.

In the preferred embodiment, the plurality of fuel passages 45 are u-shaped, however, others skilled in the art may select alternate shapes including oval, rectangular, v, round or slot form. It is preferred to have the number of the plurality of fuel passages 45 greater than or equal to 6. It is also preferred to have the plurality of fuel passages 45 tapered top down such that the width on the top is greater than the width on the bottom.

Lower valve member 30 also partially houses the upper valve member 80 and guides upper valve member 80 when being lifted off the valve seat 70 to prevent lateral or erratic movement of the upper valve member 80. This will lessen the wear of valve seat 70.

Figure 3:
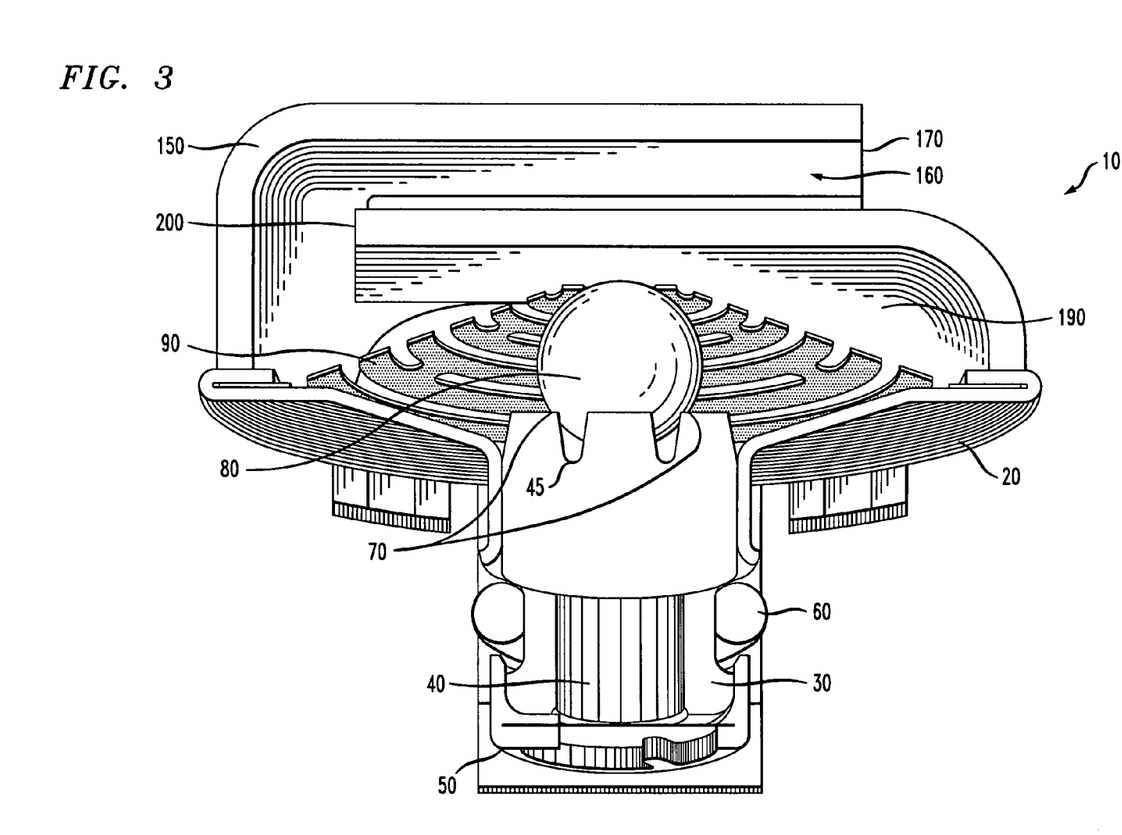
FIG. 3 illustrates a cross sectional view of a flow through regulator that includes a valve biasing member.
Figure 4:
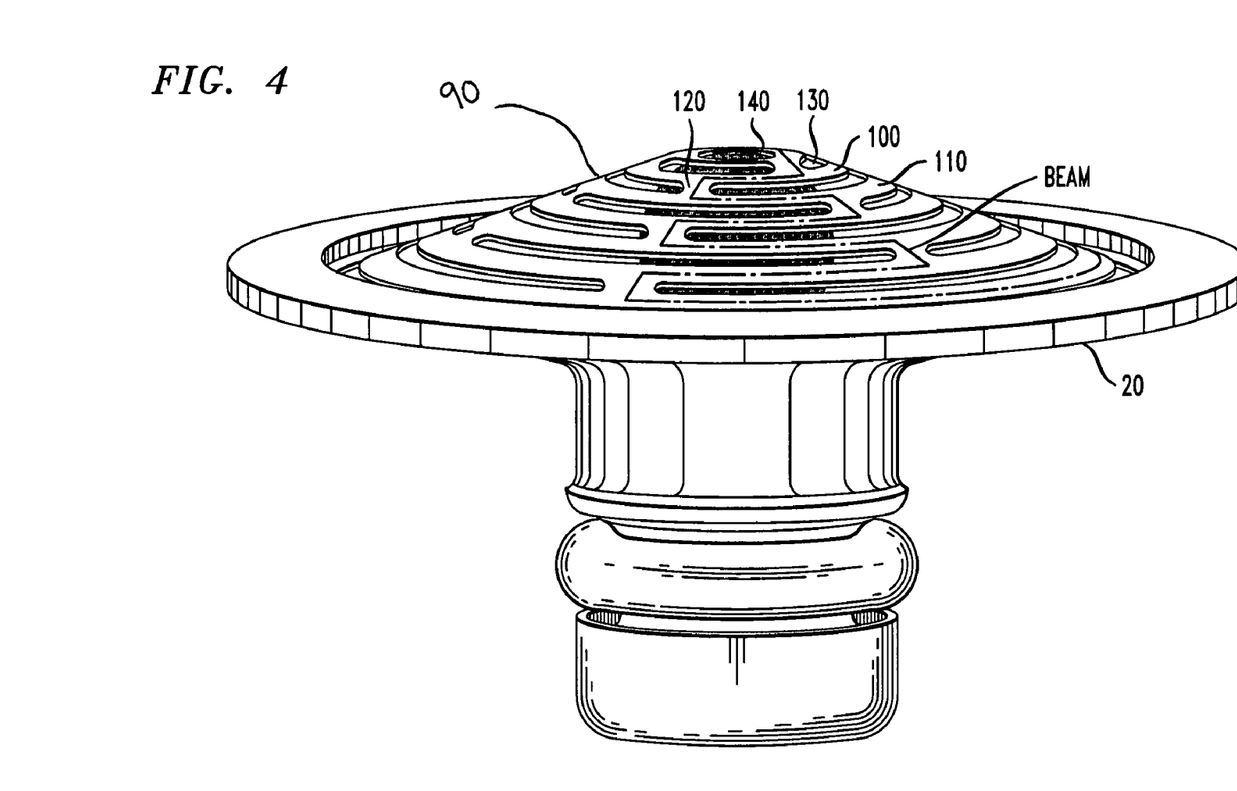
FIG. 4 illustrates is a perspective view of the flow through pressure regulator that includes a valve biasing member.

FIGS. 3 and 4 illustrate a valve assembly 5 working in a flow through pressure regulator 10. Flow through pressure regulator 10 includes a lower housing 20 that contains the lower valve member 30.

Fuel chamber 40 channels the fuel into the pressure regulator 10 from the fuel pump (not shown). Fuel will first pass through a fuel filter 50 into fuel chamber 40. Fuel filter 50, generally circular in shape, it is disposed around lower portion of lower valve member 30 and adjacent to an o-ring 60. O-ring 60 is positioned below the lower housing 20 to seal and prevent any fuel leakages into other components in the system. O-ring 60 is made of an elastomeric material and is generally circular in shape. Others skilled in the art may select not to use an o-ring 60.

Figure 5:
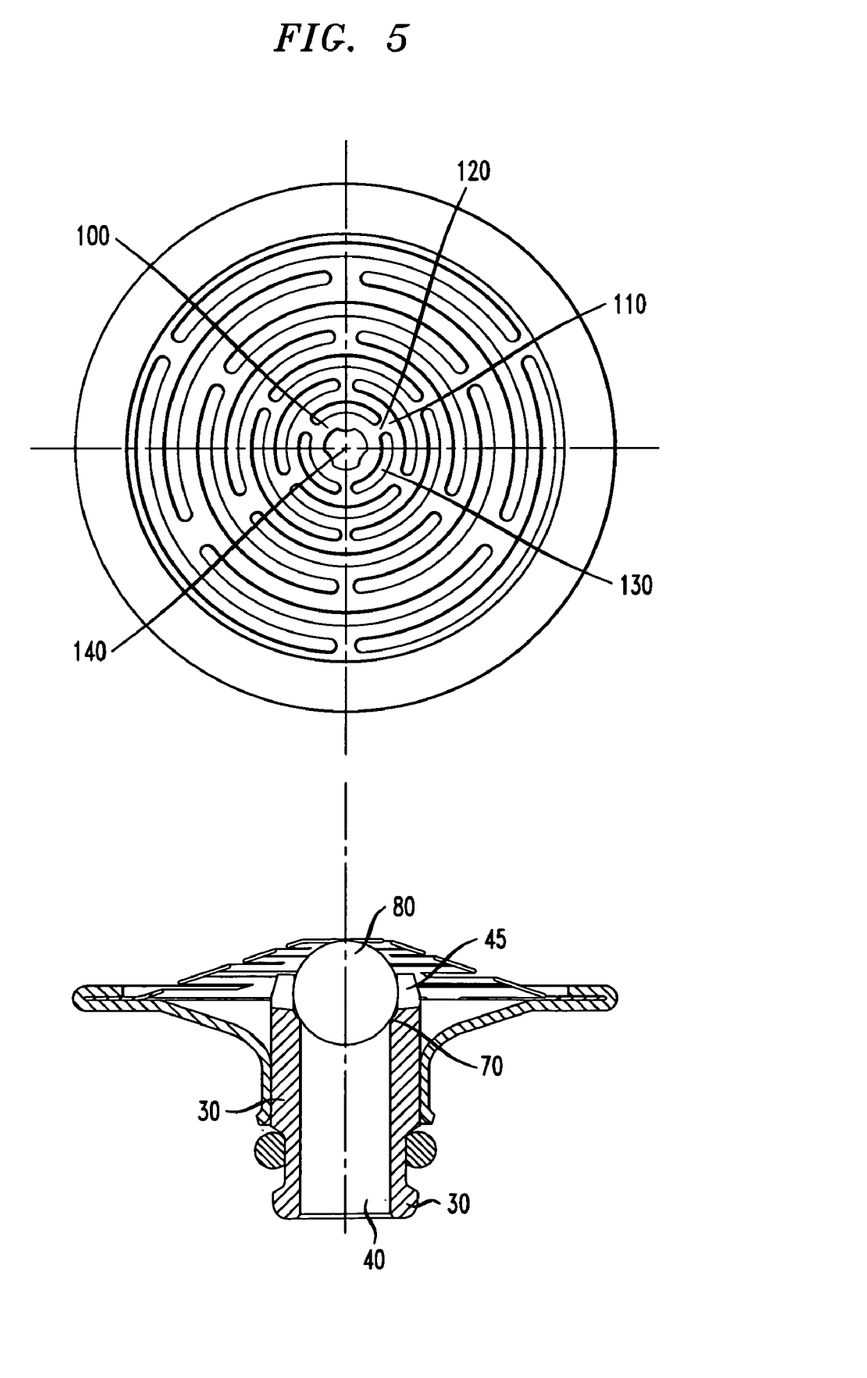
FIG. 5 illustrates a top view of the valve biasing member.

Referring to FIGS. 2 and 5, valve assembly 5 also includes a valve seat 70 which cooperates with upper valve member 80 that is movably disposed between a closed and open position. In the closed position, the upper valve member 80 contacts and seals against the seating surface of the valve seat 70 and prevents fuel flow through the valve seat 70. The upper valve member 80 is biased into the closed position by valve biasing member 90. Valve biasing member 90 is held in place by lower housing 20 which crimps over the outer edge of valve biasing member 90. Others skilled in the art may choose to affix the valve biasing member 90 to lower housing 20 with a weld or clip. Pressurized fuel flows through and accumulates in fuel chamber 40 until the pressurized fuel contacts the bottom surface of the upper valve member 80. The pressurized fuel will then push upper valve member 80 off of valve seat 70 into an open position. The fuel flows through the valve seat 70 and then flows out the plurality of fuel passages 45 which control and direct fuel as it exits the lower valve member 30. Once the upper valve member 80 lifts off the seat, the lower valve member 30 guides upper valve member 80 preventing lateral and erratic movement of upper valve member 80 which will wear valve seat 70. This will also prevent the fuel from hugging the upper valve member 80. In manufacturing the valve seat 70, the sealing surface is coined to assure smooth sealing between the upper valve member 80 and the valve seat 70.

Once the pressurized fuel is released, the upper valve member 80 is then biased back into the closed position by the valve biasing member 90. Valve biasing member 90 functions to hold the upper valve member 70 of the flow through pressure regulator 10 in a closed position at a predetermined amount of pressure that is related to the pressure desired by the flow through pressure regulator 10 specification.

In the preferred embodiment, the upper valve member 80 is shaped as a sphere and maintains a free floating design. The upper valve member 80 is not retained by other components of the flow through pressure regulator 10 and therefore does not share a permanent contact with the valve biasing member 90. The upper valve member 80 is free to move both axially and radially when displaced from the valve seat 70. Valve biasing member 90 is positioned on the upper surface of the upper valve member 80 to assist with movement of the upper valve member 80 in an axial direction away from the valve seat 70. When the pressure of the inlet fuel is greater than the force exerted by the valve biasing member 90, the fuel pushes the upper valve member 80 in an axial upward direction and the upper valve member 80 leaves the valve seat 70. Fuel flows through the flow through pressure regulator 10 until the pressure of the valve biasing member 90 is strong enough to return the upper valve member 80 to the valve seat 70 thus closing the opening in the valve seat 70. A upper valve member 80 suitable but not required is a model used in MICRA FTR model sold by Siemens VDO Automotive Corporation. Others skilled in the art may wish to select different shapes for the upper valve member 80 including a truncated sphere or cone. Others skilled in the art may also choose to weld the upper valve member 80 to the valve biasing member 90.

Referring to FIG. 4, the geometry of the valve biasing member 90 provides the force to close the upper valve member 80 and seal the opening of the valve seat 70. Valve biasing member 90 also provides the spring rate necessary to regulate the fuel pressure in the system. The geometry of valve biasing member 90 consists of at least two co-axial concentric rings 100 and 110 adhered together by at least one bridge 120. The preferred shape of the valve biasing member is annular, however, others skilled in the art may select other shapes including oval. From this geometry, balanced slot openings 130 are formed. In the preferred embodiment, the balanced slot openings 130 are arc shaped. Others skilled in the art may select a balanced slot opening 130 to be shaped as a circle, tubular, triangular or angled. Each concentric ring 110 has a beam length used to calculate the spring rate under Hookes law. The effective beam length is defined as the total length of the valve biasing member 90. The effect of changing the length of the beams, with all other factors remaining constant, will result in changes to performance criteria. At the same time, by decreasing the open area of balanced slot openings 130 where the ratio of surface area to open area is increased, the fluid flowing though the valve biasing element meets more resistance. Therefore, by increasing the effective beam length of the valve biasing member 90 and decreasing the open area of inner balanced slot opening 130, to a length greater than the radius of its largest ring, the spring rate decreases making the valve biasing member 90 less stiff. The bridge 120 connects first ring 100 with its adjacent neighbor ring 110 in a reticulated network fashion. Bridge 120 increases the effective length of the beams of valve biasing member 90 which achieves desirable spring rates for the flow through pressure regulator 10.

The valve biasing member 90 applies a balanced force to the upper valve member 80 that allows the upper valve member 80 to lift straight in an upright manner without any bias. The balanced openings 130 serve as a homogenous diffuser to direct the flow of fuel from the opening of the valve seat 70 to various directions. The balanced openings 130 disperse the fuel flow with improved flow characteristics and less noise.

Referring to FIGS. 3 and 5 the center aperture 140 of the valve biasing member 90 preferably centers on the lower housing 20 and on the central axis of valve seat 70. In the preferred embodiment, the center aperture 140 provides a three-point contact with the upper valve member 80. Others skilled in the art may contact the valve biasing member 90 with the upper valve member 80 with less than or more than three reference points. This feature centers the upper valve member 80 and achieves low flow linearity of the flow through pressure regulator 10 resulting in regulation at a low flow at the right pressure. There is no upper valve member to valve seat alignment problem with present invention and therefore, a floating upper valve member 80 design which typically requires an additional part and that is in common in other regulator designs is not required. Others skilled in the art may allow the upper valve member 80 to float in a radial direction by reducing the diameter of or eliminating entirely the center aperture 140 of the valve biasing member 90.

Figure 6:
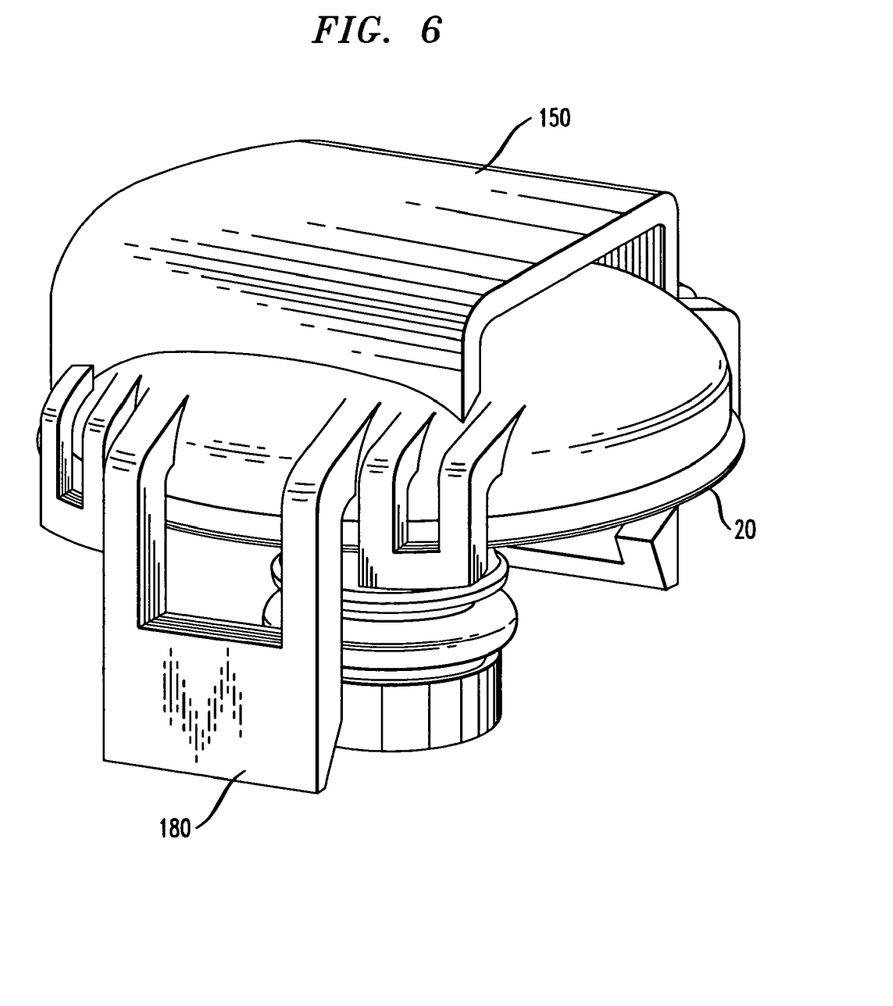
FIG. 6 illustrates a perspective view of a fuel cover for the flow through pressure regulator.

Referring to FIGS. 3 and 6, flow through pressure regulator 10 also includes a fuel cover 150. The fuel cover 150 is made of a plastic molded material and generally houses the flow through pressure regulator 10. Fuel cover 150 includes fuel passageway 160 for directing and turning the flow of fuel from the valve biasing member 90 to fuel outlet 170. The fuel outlet 170 is generally circular in shape and located on the outer edge of cover 150. Fuel cover 150 also includes at least one snap mechanism 180 allowing ease when being affixed to the flow through pressure regulator 10. The snap mechanism 180 may be directly molded into the fuel cover 150 as an integral clip. This eliminates the need for separate clip attachments. In the preferred embodiment, the snap mechanism 180 is a tab acting as a clip to hold the flow through pressure regulator 10 in place. One skilled in the art may choose not to affix fuel cover 150 to the flow through pressure regulator 10 and use flow through regulator 10 free of fuel cover 150. Fuel cover 150 also acts to keep the valve biasing member 90 submerged in fuel at all times during fuel flow which enhances durability of the valve biasing member 90 as well as dampen any vibrating noise of the valve biasing member 90. After exiting valve biasing member 90, the fuel builds in the cover chamber 190 above the valve biasing member 90 and climbs over internal wall 200 and then flows to fuel outlet 170. By this process, the flow of fuel exits in an organized flow and does not discharge in various directions. Similarly, submergence of the valve biasing member 90 in the fuel ensures that the fuel is located on both the top portion and the bottom portion of the valve biasing member 90. Submergence of the valve biasing member 90 in fuel also ensures that the fuel is not aerated which consequently lessens noise in the flow through pressure regulator 10. Lastly, the fuel cover 150 protects the valve biasing member 90 during shipping and handling.

Figure 7:
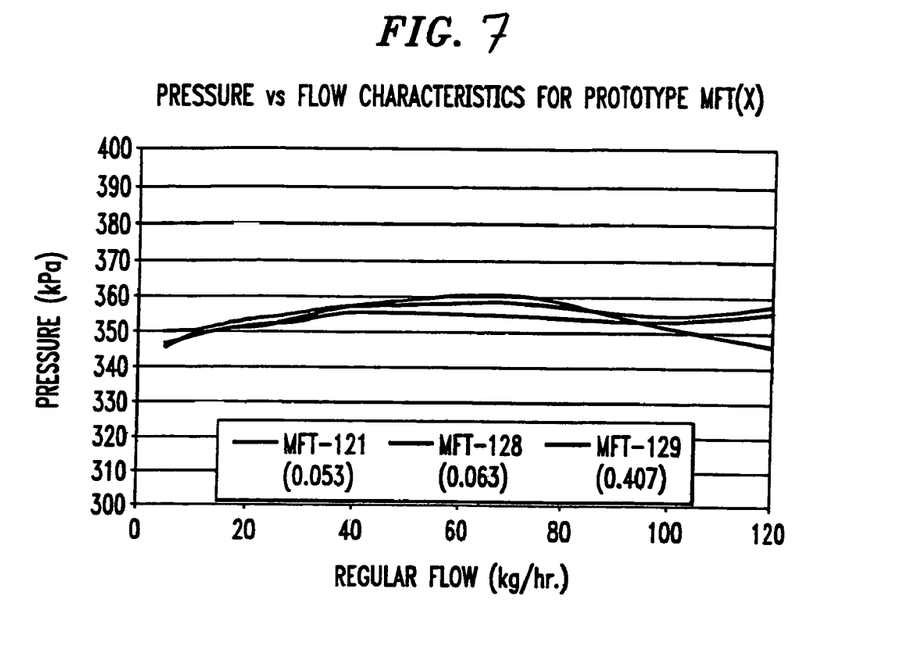
FIG. 7 is a graph illustrating the relationship between pressure, measured in kilopascals, and flow rate, measured in kilograms per hour.

The graph in FIG. 7 illustrates that as flow rate increases pressure remains constant in the present invention with valve assembly 5. FIG. 7 shows pressure measured on the y axis in comparison to flow rate measured on the x axis with their slope being of primary interest. Ideally the slope of the line on the graph would be zero where there is a constant horizontal pressure line at every flow rate. Practically, as shown with the graph the pressure versus flow characteristics do resemble a slope of close to zero.

Figure 8:
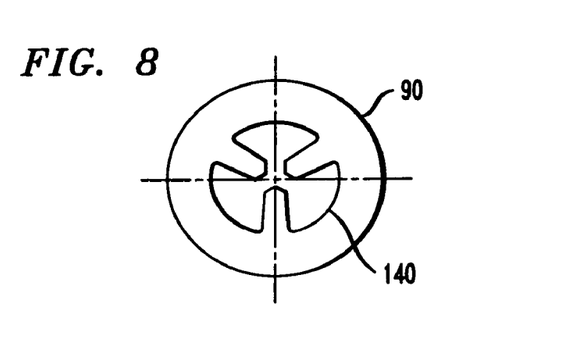
FIG. 8 illustrates a top view of an alternative 3 point of contact embodiment of the valve biasing member.
Figure 9:
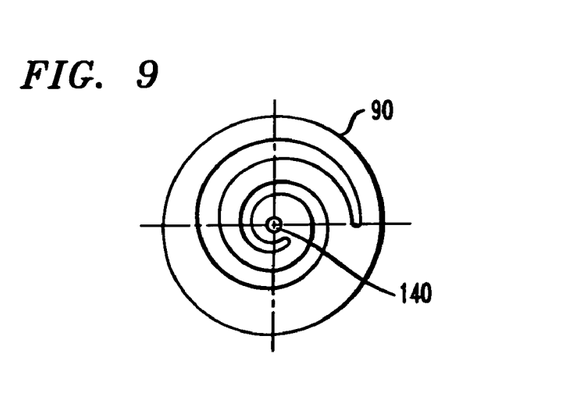
FIG. 9 illustrates a top view of an alternative spiral embodiment of the valve biasing element.

FIGS. 8 and 9 illustrate alternative embodiments of the valve biasing member 90. In these embodiments, all the various elements of the flow through pressure regulator 10 are identical with exception to the valve biasing member 90. In FIG. 8, the geometry of valve biasing member 90 is a flat disk including at least a three point of contact aperture 140 with no concentric ring geometry. In FIG. 9, the geometry of valve biasing member 90 is a flat disk with a spiral shape having center aperture 140.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments and equivalents thereof.

The invention claimed is:

1. A flow through pressure regulator comprising:
a housing having a fuel inlet communicating with a fuel chamber, wherein a flow of fuel through the fuel inlet and the fuel chamber communicates with a valve assembly;

the valve assembly comprising a lower valve member wherein a plurality of fuel passages are circumferentially spaced around a top portion of the lower valve member to direct the flow of fuel;

the valve assembly regulating the flow of fuel from the fuel inlet through the housing to a fuel outlet wherein an upper valve member rests on a valve seat in a closed position to prohibit the flow of fuel from the fuel inlet to the fuel outlet;

a valve biasing member for biasing the upper valve member toward the valve seat in opposition to pressure exerted on the upper valve member by the fuel in the fuel chamber, wherein the valve biasing member includes at least three co-axial, concentric rings joined together by a plurality of bridges in a reticulated network fashion thereby defining a plurality of co-axial, concentric slot openings in the valve biasing member at a plurality of different radii from a center of the valve biasing member, wherein at least two bridges connect adjacent rings; and a fuel cover, separate from the housing, for directing the flow of fuel from the valve biasing member to the fuel outlet, the fuel cover defining a chamber in communication with the valve biasing member, the chamber being constructed and arranged to permit fuel to build therein and to contain the fuel to as to submerge the valve biasing member in the fuel, wherein the valve biasing member has a continuous annular outer edge surface, having a width greater than a width of each of the rings, that is welded, crimped or clipped to the housing, and a portion of the valve biasing member near the center being in non-fixed relation with the upper valve member to be freely movable so as to engage and bias the upper valve member under certain pressure conditions in the pressure regulator.

2. The pressure regulator of claim 1, wherein the upper valve member displaces axially off the valve seat.

3. The pressure regular of claim 1, wherein upper valve member is one of a sphere or a truncated sphere.

4. The pressure regulator of claim 1, wherein the upper valve member is a free floating design.

5. The pressure regulator of claim 1, wherein valve seat is coined through a manufacturing process for smooth sealing.

6. The pressure regulator of claim 1, wherein the lower valve member houses the upper valve member.

7. The pressure regulator of claim 1, wherein the lower valve member guides the upper valve member as the upper valve element lifts off the valve seat into an open position.

8. The pressure regulator of claim 1, wherein the plurality of fuel passages are shaped in a circle, u, v, rectangle or slot form.

9. The pressure regulator of claim 1, wherein the plurality of fuel passages equal at least 6 or greater.

10. The pressure regulator of claim 1, wherein the plurality of fuel passages taper top down.

11. The pressure regulator of claim 1, wherein the fuel outlet is disposed on the fuel cover.

12. The pressure regulator of claim 11, further comprising an integral passageway directing flow of fuel from the valve biasing member to the fuel outlet.

13. The pressure regulator of claim 11, further comprising an internal wall.

14. The pressure regulator of claim 11, further comprising at least one snap mechanism for affixation to the flow through pressure regulator.

15. A flow through pressure regulator comprising:
a lower housing having a fuel inlet communicating with a fuel chamber, wherein a flow of fuel through the fuel inlet and the fuel chamber communicates with a valve assembly;
the valve assembly comprising a lower valve member wherein a plurality of fuel passages are circumferentially spaced around a top portion of the lower valve member to direct the flow of fuel,
the valve assembly regulating the flow of fuel from the fuel inlet through the lower housing to a fuel outlet wherein an upper valve member rests on a valve seat in a closed position to prohibit the flow of fuel from the fuel inlet to the fuel outlet;
a valve biasing member for biasing the upper valve member toward the valve seat in opposition to pressure exerted on the upper valve member by the fuel in the fuel chamber; and
a fuel cover for directing the flow of fuel from the valve biasing member to the fuel outlet,
wherein the valve biasing member is a flat disk having a generally y-shaped center aperture so as to make only three-point contact with the upper valve member, the valve biasing member having a continuous annular outer edge that is fixedly secured with respect to the lower housing, and a portion of the valve biasing member near the center aperture being freely movable so as to engage and bias the valve element under certain pressure conditions in the pressure regulator.

16. A method for regulating fuel in a flow through pressure regulator, the method comprising:
providing a lower valve member comprising a plurality of fuel passages to direct fuel from a fuel inlet to a fuel outlet;
communicating the fuel flow with a valve biasing member after the fuel flows through the lower valve member wherein the valve biasing member includes at least three co-axial, concentric rings joined together by a plurality of bridges in a reticulated network fashion thereby defining a plurality of co-axial, concentric slot openings in the valve biasing member at a plurality of different radii from a center of the valve biasing member;
providing an upper valve member to prohibit the fuel flow to the fuel outlet, and
providing a separate fuel cover defining a chamber in communication with the valve biasing member, the chamber being constructed and arranged to permit fuel to build therein and to contain the fuel to as to submerge the valve biasing member in the fuel,
wherein the valve biasing member has a continuous annular outer edge surface, having a width greater than a width of each of the rings, that is welded, crimped or clipped to a housing of the regulator, and a portion of the valve biasing member near the center being in non-fixed relation with the upper valve member to be freely movable so as to engage and bias the upper valve member under certain pressure conditions in the pressure regulator.

17. The method of claim 16, wherein the bridge increases an effective beam length of the valve biasing member to a length greater than a radius of a largest reticulated concentric ring.

18. The method of claim 16, wherein the chamber is constructed and arranged to ensure that the valve biasing member is submerged in fuel at all times during fuel flow.

19. The method of claim 16, wherein the plurality of fuel passages equals 6 or greater.

20. The method of claim 16, wherein the plurality of fuel passages taper top down.

21. The method of claim 16, wherein the fuel outlet is disposed on a fuel cover.

22. The method of claim 16, wherein the fuel cover directs the fuel flow from the valve biasing member to the fuel outlet in an organized flow.

* * * * *